March 24, 1942. S. RUBEN Re. 22,053

MAGNESIUM PRIMARY CELL

Original Filed June 15, 1940

INVENTOR
Samuel Ruben
BY
Leo Robbins
ATTORNEY

Reissued Mar. 24, 1942

Re. 22,053

UNITED STATES PATENT OFFICE 22,053

MAGNESIUM PRIMARY CELL

Samuel Ruben, New Rochelle, N. Y.

Original No. 2,257,130, dated September 30, 1941, Serial No. 340,738, June 15, 1940. Application for reissue December 24, 1941, Serial No. 424,305

9 Claims. (Cl. 136—100)

This invention relates to a primary cell; specifically to a cell employing magnesium as the negative plate element. This application is a continuation in part of my pending application bearing Serial Number 309,993, filed December 19, 1939.

An object of the invention is the provision of a cell having a higher output than cells now in use, which has a long life and which may be economically and readily manufactured.

Another object is the provision of a primary cell which will maintain its potential over a substantial part of its operating life. (While various textbooks and dictionaries are not in accord as to the classification of magnesium, this element has been designated here as an alkaline earth metal in view of its position in the second periodic group and because of its property, in common with calcium, strontium and varium, of forming basic compounds.)

A further object is the provision of a primary cell capable of supplying current over sustained periods without excessive polarizing effects.

A further object is the provision of a cell having a high power output for a given weight and volume.

Another object is the provision of such a cell having a low shelf life loss.

A further object is the provision of a primary cell of novel construction.

Figure 1:
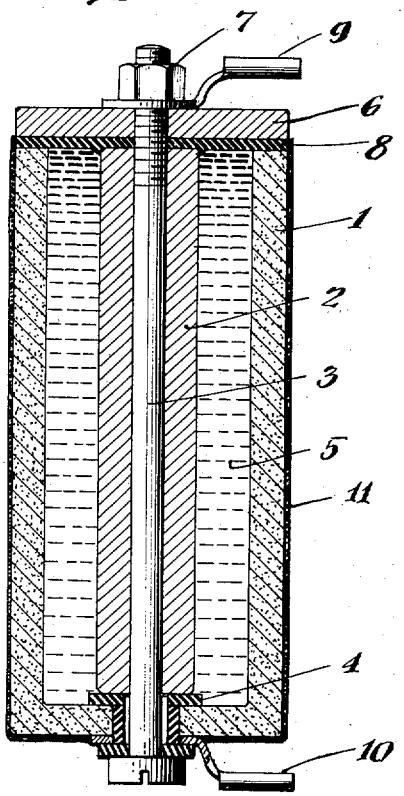
Figure 2:
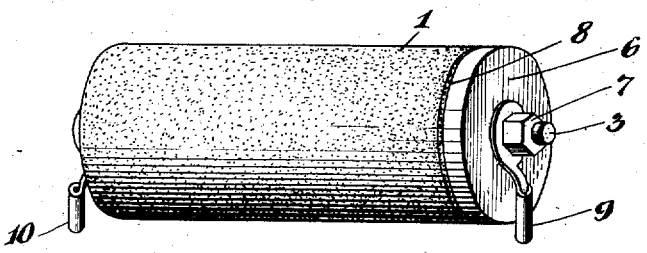

Other objects will be apparent from the disclosure and from the drawing in which Fig. 1 is a view partly in section of a battery embodying features of the invention, Fig. 2 being a view in perspective of the battery.

The invention comprises a primary cell having a negative plate of magnesium, a cooperating electrode and an electrolyte comprising chromic acid and a fluoride derived from an alkaline base.

Magnesium has been heretofore recognized as an electrode, which, due to its high solution pressure, could make possible an efficient primary cell for maximum capacity in a given space. However, the various electrolytes which has been mentioned in the art for use with magnesium have failed of their purpose due to the fact that they have had an excess chemical dissolving effect on the magnesium, regardless of whether current flow obtained.

Although the prior art discloses the use of a magnesium electrode in an electrolyte of chromic acid, such batteries are not commercially used. The present day primary cell uses a zinc electrode for the reason that magnesium, in known electrolytes, although it delivers more current, shows a higher corrosion and a much greater loss of weight, the magnesium being more rapidly consumed than the zinc.

Magnesium is insoluble in chromic acid and it is also insoluble in alkali metal and alkaline earth metal fluorides such as potassium, lithium, magnesium, and calcium fluorides.

I have found that when chromic acid is used as an electrolyte the magnesium becomes passive and the voltage rapidly drops to a negligible value. A similar result obtains when one of the above mentioned fluorides is used as an electrolyte. However, I have also found that when one or more of these fluorides is added to the chromic acid, the magnesium loses its passive character during current flow, but returns to a passive condition when not used or in the absence of current flow if the proper fluoride and percent content of fluoride is present.

While many salts will reduce or eliminate the passivity of magnesium in chromic acid, they will also cause rapid dissolution of the magnesium; among each unsuitable salts may be mentioned chlorides in general, iodides, bromides, et cetera.

In the case of the alkali metal fluorides, as an example, potassium fluoride, I have found that due to its solubility in water, the quantity for combination with the chromic acid must be kept low; otherwise rapid dissolving of the magnesium occurs. I have found that the percent allowable depends upon the solubility of the salt; the more soluble, the less the amount used. I have found, for example, that compared with potassium fluoride, a large quantity of lithium fluoride can be used without excessive local action because the lithium fluoride has a low solubility in water. In the case of lithium fluoride, I have found that in order to reduce shelf corrosion to a minimum, the chromic acid should be of maximum concentration. Thus, with a solution containing 160 grams of chromic acid per 100 cc. of water it is possible to use an excess amount of lithium fluoride, for example, one gram for each 100 grams of chromic acid. If the chromic acid concentration is less, for example, 50 grams per 100 cc. of water, the lithium fluoride content should not be greater than the one gram per 100 grams of chromic acid.

In the use of the alkali metal fluorides and for maximum life and minimum non use corrosive action on the magnesium I have found that lithium fluoride, because of its low solubility, when used in a chromic acid solution greater than 50% by weight, will give the longest life, this being due in part, to the fact that an excess amount of lithium fluoride is present for preventing polarization of the magnesium during operation. With the same quantity of sodium, potassium, or rubidium fluoride, rapid dissolving of the magnesium electrode is observed.

However, while the alkali metal fluorides are suitable to a satisfactory degree for some purposes, I have found that the alkaline earth metal fluorides are superior. The most suitable fluoride is magnesium fluoride which has a solubility of only .0076 gram per 100 ml. of $H_2O$. If magnesium fluoride is heated in hot chromic acid so that a sufficient amount is dissolved in the acid to prevent polarization of the magnesium electrode during current generation, minimum local or noncurrent generating corrosive action is obtained. Furthermore, magnesium fluoride can be used in an excess quantity without deleterious effect so that an adequate fluoride content in the electrolyte is maintained.

While other fluorides in the alkaline earth group show a somewhat similar effect, the magnesium fluoride is preferred, the calcium fluoride being next in order of desirability.

I have found, with the electrolytes of this invention, that the loss of magnesium electrodes with shelf life is determined by two factors, namely, the solubility of the fluoride and the position (in the electro-chemical series) of the metal of which the fluoride is formed in respect to magnesium. It is for this reason, I believe, that magnesium fluoride has given the best results in respect to the shelf life and efficiency of the cell.

In general, I have found that with a given chromic acid content, fluorides having a solubility less than .27 gram per 100 ml. of $H_2O$ give the minimum attack, but that the fluoride chosen should have a solubility greater than .001 gram and preferably at least in the order of .007 gram per 100 ml. of $H_2O$ to have a depolarizing effect.

In my cell, the depolarization of the positive carbon electrode is accomplished by the chromic acid, which is preferably of the maximum concentration such as 160 grams per 100 grams of water. With this concentration I prefer to use one gram of magnesium fluoride.

The magnesium fluoride could be produced by the addition of hydrofluoric acid to the chromic acid solution but the quantity produced is too low and excess attack of magnesium is noted.

While all the alkali metal fluorides are useful to some extent, by choosing one having only a sufficient solubility to be effective, local noncurrent generating dissolution can be kept to a negligible value. By using the alkaline earth fluoride, it is possible to be less critical in respect to the amount used in the mixture with the chromic acid and also allow for an excess to insure maximum life of the cell. Where the alkali metal fluorides are used, the content must be kept below saturation to avoid excess local attack.

With magnesium fluoride, however, due to its low solubility, one gram per 100 grams of chromic acid can be used, the amount not being critical and being dependent upon other factors such as weight of electrodes and size of container.

I have tried other anions with the chromic acid, such as the sulphates, nitrates, etc., in place of the alkaline earth and alkali metal fluorides, but they caused excessive attack of the magnesium. I have also tried other halogen salts such as the iodides and chlorides, and while they will initially function in a manner similar to the alkaline earth and alkali metal fluorides, they cause a decrease in shelf life by continuous attack of the magnesium electrode even when no current is being discharged.

The improved practical results as far as my tests show, are obtainable only by the use of fluorides derived from an alkaline base.

By having the best balance between the chromic acid content and the fluoride content, a condition is obtained where with no current flow, the attack on the magnesium is of low order, the magnesium becoming substantially passive under such conditions. This condition is evidenced by the behavior of the cells—for example, a cell which might show a potential of 1.9 volts when first connected may have a potential of two volts immediately thereafter, thus indicating that the passive condition has been reduced during operation.

It is desirable that pure magnesium be used and that the chromic acid-fluoride solution be as free as possible from impurities and undesirable anions, especially chlorides. Preferably the magnesium is used in rod or in cast form, as there appears to be a greater consumption of magnesium when it is utilized in thin sheet form, the magnesium being consumed at a much faster rate probably due to the presence of magnesium oxide rolled into the sheet during the process of reduction. It is desirable also that the magnesium be coated or insulated at the junction between the solution and the air space, as the drying of the solution due to creepage at the air line causes corrosion. The cooperating electrode may be carbon or carbonized nickel or other suitable material.

Referring to the drawing in which similar numbers denote similar parts:

The container 1, is a carbon cup which serves as the positive electrode. Magnesium rod 2, constitutes the negative plate; steel screw 3, which passes up through the center of the magnesium rod is insulated from the container 1, by Korite insulators 4, contact with the positive carbon element being made by terminal member 10. After the cell is filled with electrolyte 5 composed of a chromic acid-magnesium fluoride solution, Korite washer 8, having a central opening to accommodate steel screw 3, is fixed in place to close the cell; thereafter top steel washer 6, in contact with terminal 9, is flattened down against the Korite washer by nut 7. After assembly, the cell may be dipped in or sprayed with Koroseal insulating varnish 11, or similar material to prevent seepage through of the electrolyte if the carbon container should be porous. The purpose of the steel screw 3, in addition to fastening the top nut so as to seal the cell is also to keep the cell sealed even after all the magnesium is consumed, so as to avoid any spillage of the electrolyte. The magnesium rod can be cast with fins so as to increase the available area where higher currents are desired, and if desired, immobilizing agents may be added to the electrolyte such as silica gel. The cell as described generates two volts and by virtue of the unique construction shown and consequent large area of carbon in contact with the electrolyte, a rapid depolarization of the positive plate area by the chromic acid is effected.

Where currents of high density are required, a gas vent may be incorporated to allow discharge of any uncombined or accumulated gas.

Having described my invention, what I claim as new and desire to secure by Letters Patent, is:

1. A primary cell comprising a negative electrode of magnesium, a cooperating positive electrode and an electrolyte comprising aqueous solutions of chromic acid and a fluoride of at least one of the metals, magnesium, calcium, strontium and barium.

2. A primary cell comprising a negative electrode of magnesium, a positive electrode and an electrolyte comprising chromic acid and magnesium fluoride.

3. A primary cell comprising a negative electrode of magnesium, a positive electrode of carbon material and an electrolyte comprising chromic acid and a fluoride of an alkaline earth metal of the second periodic group.

4. A primary cell comprising a negative electrode of magnesium, a positive electrode of carbon material and an electrolyte comprising chromic acid and magnesium fluoride.

5. A primary cell comprising a negative electrode of magnesium, a positive electrode of carbon material and an electrolyte comprising chromic acid and calcium fluoride.

6. In a primary cell, the combination with a magnesium electrode of a cooperating electrode and an electrolyte, said electrolyte essentially comprising two compounds in each of which the magnesium is separately passive, one of said compounds being chromic acid and the other of said compounds being a fluoride having the property of causing the magnesium to lose its passivity in respect to the chromic acid during current flow.

7. In a primary cell, the combination with a magnesium electrode of a cooperating electrode of carbon material and an electrolyte in which the magnesium is active and dissolves during current flow, said electrolyte essentially comprising two compounds, each of which separately has the property of causing magnesium to become passive and in each of which separately magnesium is substantially insoluble, one of said compounds being chromic acid and the other being a water soluble fluoride having the property when added to chromic acid, of causing the magnesium to lose its passive character during current flow, the amount of chromic acid in said electrolyte far exceeding the amount of fluoride therein.

8. In a primary cell, the combination with a magnesium electrode of a cooperating electrode and an electrolyte, said electrolyte comprising essentially chromic acid in which the magnesium is separately substantially insoluble and a fluoride in which the magnesium is separately substantially insoluble, said fluoride having the property of combining with said chromic acid to form a composite electrolyte in which said magnesium is soluble, and in which the magnesium becomes active in respect to the chromic acid during current flow.

9. In a primary cell, the combination with a magnesium electrode of a cooperating electrode and an electrolyte, said electrolyte comprising chromic acid which when used separately as an electrolyte causes magnesium to become passive, and a water soluble fluoride which also when used separately as an electrolyte causes magnesium to become passive, said fluoride being such that when added to the chromic acid to form the electrolyte of said cell, a solution is obtained in which the magnesium loses its passive character during current flow but returns to a relatively passive condition in the absence of current flow.

SAMUEL RUBEN.